US007424267B2

(12) United States Patent
Eisenbach

(10) Patent No.: US 7,424,267 B2
(45) Date of Patent: Sep. 9, 2008

(54) AUTOMATIC RESOURCE AVAILABILITY USING BLUETOOTH

(75) Inventor: Andre Eisenbach, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 600 days.

(21) Appl. No.: 11/073,801

(22) Filed: Mar. 7, 2005

(65) Prior Publication Data

US 2006/0199537 A1 Sep. 7, 2006

(51) Int. Cl.
H04B 7/00 (2006.01)
(52) U.S. Cl. ............... 455/41.2; 455/41.3; 455/566
(58) Field of Classification Search ............. 455/41.2, 455/41.3, 11.1, 13.1, 566
See application file for complete search history.

(56) References Cited

U.S. PATENT DOCUMENTS

| 6,772,331 | B1* | 8/2004 | Hind et al. ............ 713/151 |
| 2002/0087632 | A1 | 7/2002 | Keskar |
| 2004/0126038 | A1* | 7/2004 | Aublant et al. ............ 382/305 |
| 2004/0203381 | A1 | 10/2004 | Cahn et al |
| 2004/0230790 | A1 | 11/2004 | Zhang et al. |
| 2006/0046709 | A1* | 3/2006 | Krumm et al. ............ 455/422.1 |

FOREIGN PATENT DOCUMENTS

| EP | 1255383 A | 11/2002 |
| EP | 1450273 A | 8/2004 |
| EP | 1511235 A | 3/2005 |
| WO | WO-2004/112321 A | 12/2004 |

OTHER PUBLICATIONS

Specification of the Bluetooth System, Version 1.2, Nov. 5, 2003, pp. 1-1200.

* cited by examiner

Primary Examiner—Tuan A Pham
(74) Attorney, Agent, or Firm—McAndrews, Held & Malloy, Ltd.

(57) ABSTRACT

A method, apparatus, and system for automatically sharing data resources between Bluetooth devices. A Bluetooth device is paired with a "trusted" Bluetooth device. When paired devices are found, the Bluetooth device automatically allows the other device to present a virtual representation of data that is shared. The shared data can be selectively downloaded for use by the other device as long as the devices are in proximity. In an alternate embodiment, the devices may share pairing information with a network, so that the same shared resource can be made available at a large number of access points but specifically only for one paired, trusted device.

17 Claims, 4 Drawing Sheets

AUTOMATIC RESOURCE AVAILABILITY USING BLUETOOTH

CROSS-REFERENCE TO RELATED APPLICATIONS/INCORPORATION BY REFERENCE

Two other applications, by the same inventor and assigned to a common assignee, have been filed on the same date that contain similar disclosure in the area of Bluetooth devices. The two other applications are U.S. patent application Ser. No. 11/074,271, filed Mar. 7, 2005 and U.S. patent application Ser. No. 11/073,647, filed Mar. 7, 2005),

FIELD OF THE INVENTION

Certain embodiments of the invention provide for automatically sharing files or other resources on a Bluetooth device with another Bluetooth device that is brought into the proximity of the first Bluetooth device. Aspects of the invention allow for establishing such shared relationships with devices that are "trusted" using the Bluetooth pairing procedure.

BACKGROUND OF THE INVENTION

More and more personal data is being stored on ever smaller and more mobile devices. As the amount of mobile data increases, so does the desire to share that data both between other devices that are personal to the user and with devices that may not be personal but that it might be desirable to share selected data with for a period of time. Bluetooth devices have tremendous flexibility in terms of what devices they may connect to, but there is a need for transparent management of data over the expanding number of possible connections to relieve the burden on users of cumbersome file download and sharing procedures. Furthermore, when files are copied from one device to another, it is inevitable that one of the files will become out of date. Thus, it would be desirable to allow data to be shared "virtually" in the sense that the actual data is maintained on only one device, with virtual access to the data being managed across the Bluetooth link without actually incurring the overhead and risk of data inconsistency inherent in a complete file download.

Further limitations and disadvantages of conventional and traditional approaches to securing personal computing devices will become apparent to one of skill in the art, through comparison of such systems with some aspects of the present invention as set forth in the remainder of the present application with reference to the drawings.

BRIEF SUMMARY OF THE INVENTION

Aspects of the invention may be found in a method and system for automatically sharing resources between Bluetooth equipped devices, as shown in and/or described in connection with at least one of the figures, as set forth more completely in the claims.

These and other advantages, aspects and novel features of the present invention, as well as details of an illustrated embodiment will be more fully understood from the following description and drawings.

DETAILED DESCRIPTION OF THE INVENTION

Certain embodiments of the invention may be found in a method and system for detecting the proximity of Bluetooth devices and establishing a trusted relationship with the device or devices. Certain embodiments of the invention may be found in a method and system for using the trusted relationship to automatically make shared resources available on both Bluetooth devices when the trusted device is detected in the proximity of the locating proximate Bluetooth® devices and selecting the lowest cost device for accessing the network. Additional embodiments perform these functions automatically based on the user's preferences.

Bluetooth wireless technology is set to revolutionize personal connectivity by providing freedom from wired connections. Bluetooth is a specification for a small form-factor, low-cost radio solution providing links between mobile computers, mobile phones and other portable and handheld devices. Of particular interest is Bluetooth's low power consumption and short range, coupled with the ability of Bluetooth devices to automatically detect and attach to other Bluetooth devices that are close by, typically within 10 meters or less, coupled with the ability to support reasonably high data rates in an environment where the local, Bluetooth piconet is used to access wider area networks.

About Bluetooth

Bluetooth wireless technology is an international, open standard for allowing intelligent devices to communicate with each other through wireless, short-range communications. This technology allows any sort of electronic equipment—from computers and cell phones to keyboards and headphones—to make its own connections, without wires, cables or any direct action from a user. Bluetooth is currently incorporated into numerous commercial products including laptops, PDAs, cell phones, and printers, with more products coming out every day.

How Bluetooth Works

Figure 1:
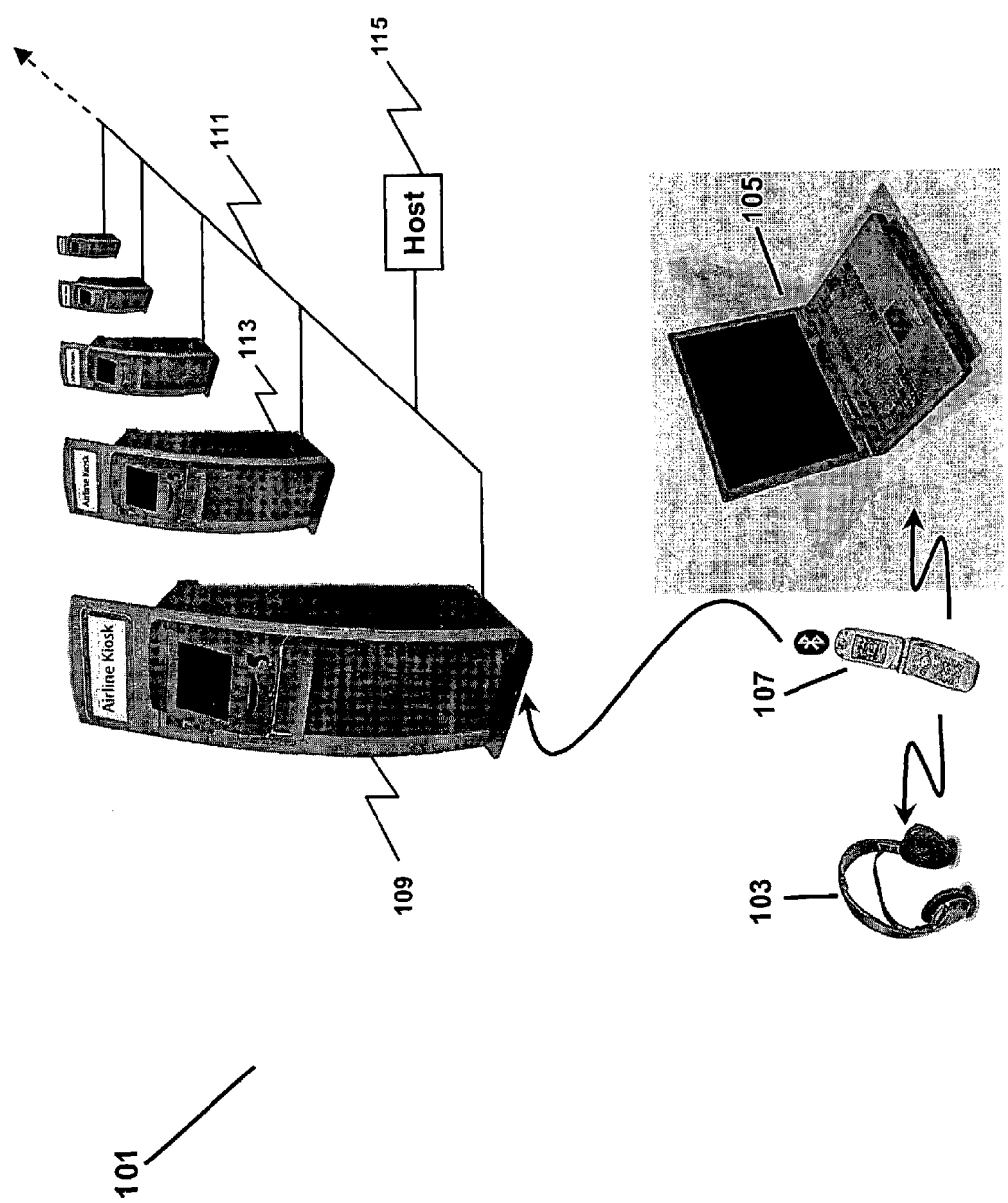
FIG. 1 is a diagram illustrating a basic Bluetooth® (BT) piconet.

Bluetooth is a frequency hopping spread spectrum (FHSS) radio system operating in the 2.4 GHz unlicensed band. Its low power transmissions allow a typical range of about 10 meters. Devices connect to each other to form a network known as a piconet, with up to seven active devices in the piconet. FIG. 1 shows such a piconet, 101. The maximum data throughput between devices is approximately 7823 kbps with the data capacity shared between devices on the piconet.

Figure 2:
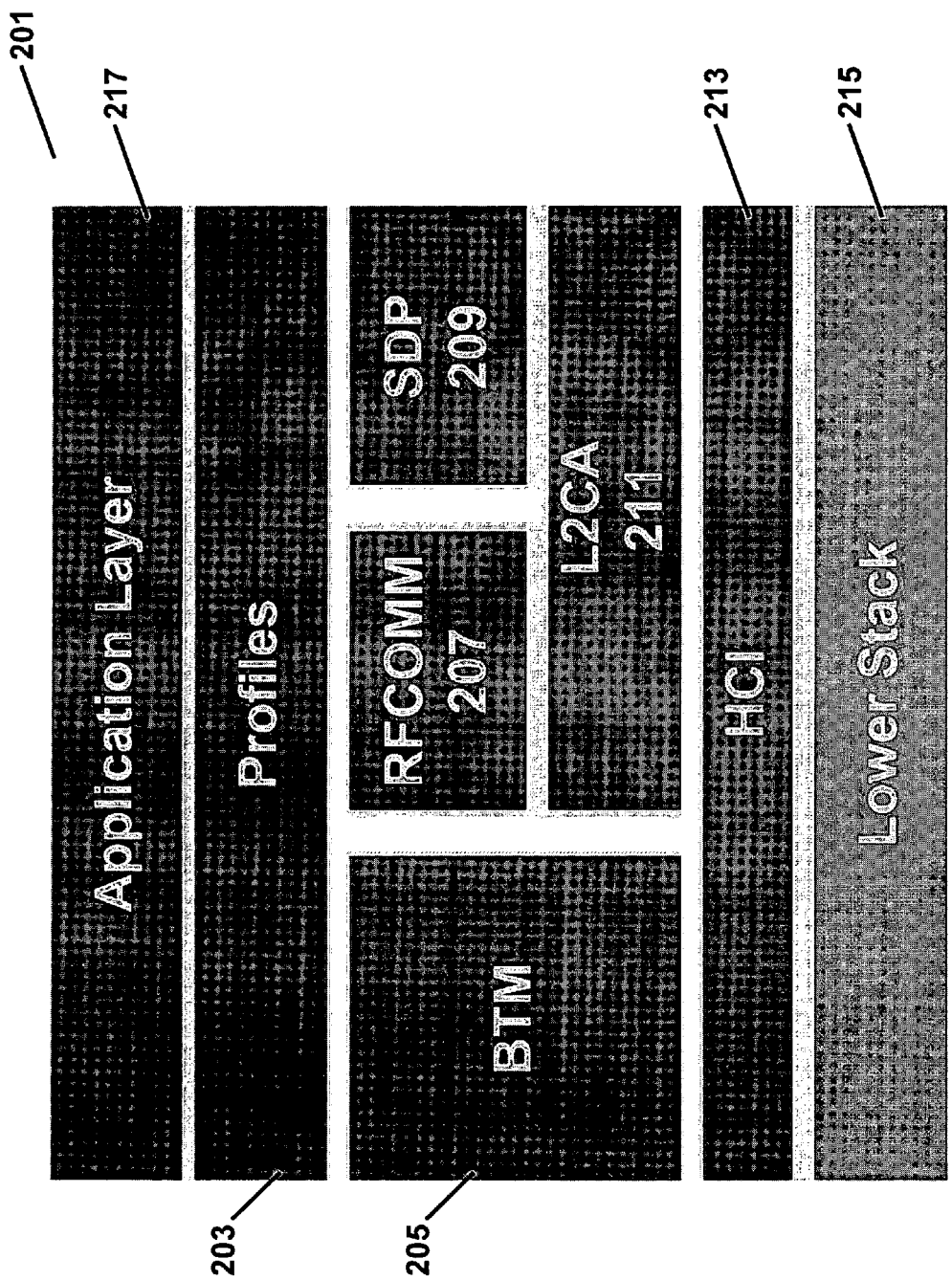
FIG. 2 is a simplified exemplary protocol stack.

Bluetooth has a protocol stack to transfer data and implement the advanced features required by applications. The protocol stack consists of several different protocols designed for different purposes. The profiles, or applications, reside above the protocol stack. Bluetooth also has a lower protocol stack for link management and baseband control. FIG. 2 is a simplified exemplary protocol stack 201. The stack includes Profiles 203, a BTM 205, RFCOMM 207, SDP 209, L2CAP 211, HCI 213, and Lower Stack 215. The application layer 217 contains the computer programs that actually implement useful tools that take advantage of the Bluetooth functionality.

Figure 3:
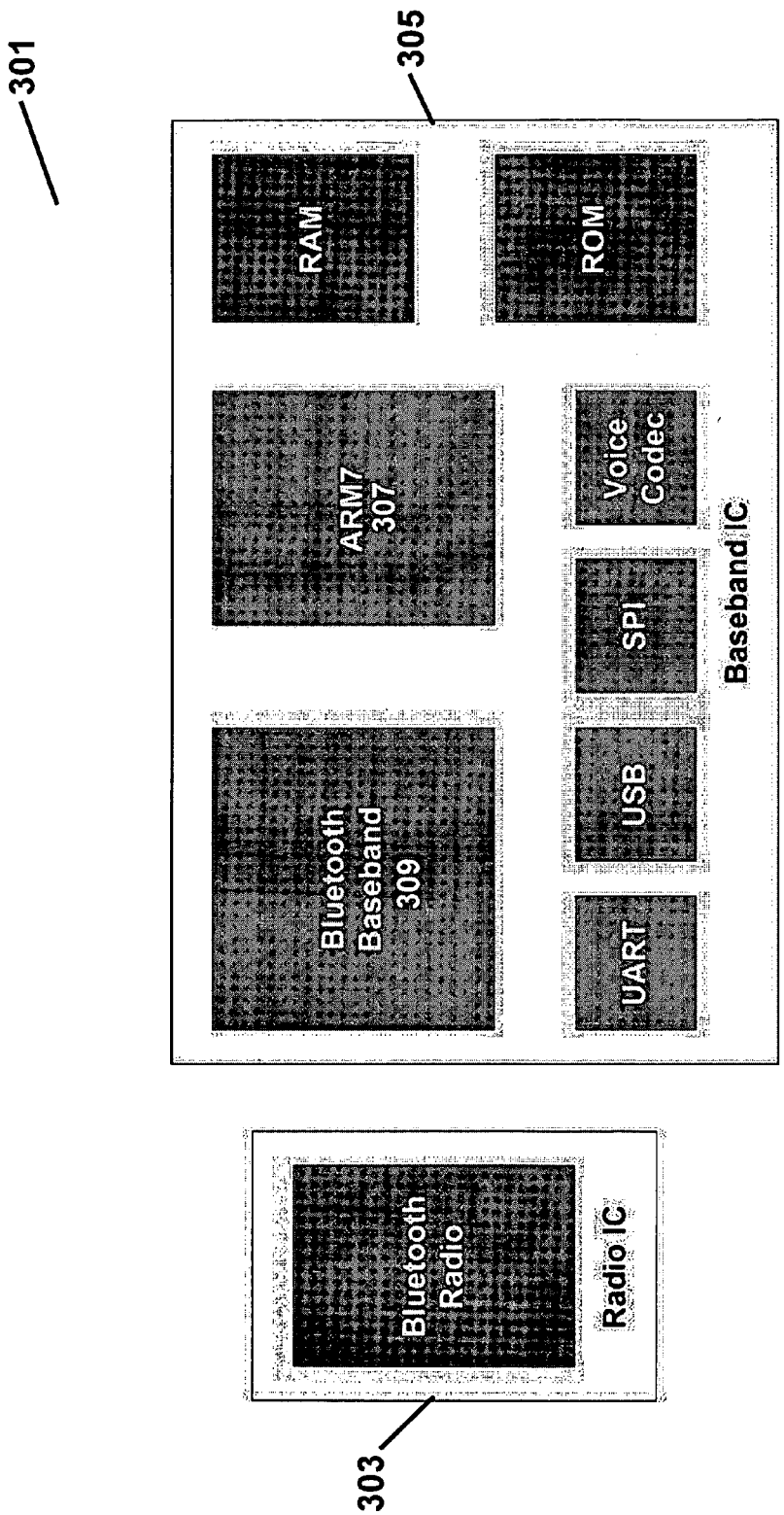
FIG. 3 is a block diagram illustrating an exemplary Bluetooth® hardware implementation, that runs the protocol stack of FIG. 2, for example, in accordance with an exemplary embodiment of the present invention.

Bluetooth hardware implementations are typically highly integrated systems consisting of one or two chips. FIG. 3 is a block diagram illustrating an exemplary Bluetooth® hardware implementation, which includes a Radio IC 303 and a Baseband IC 305.

The Bluetooth baseband chip consists of a processor core such as an ARM7 with integrated memories 307, Bluetooth baseband 309, and several other peripherals. The radio is implemented in a separate chip 303. The ARM7 processor runs all the required software including a lower stack, an upper stack, and an embedded profile. This type of single CPU implementation allows for a small, low power, low cost solution.

The software "stack" contemplates the insertion of useful applications in the higher layers of the stack. These applications can be designed to take advantage of Bluetooth's lower layers to implement functionality based on Bluetooth radio links.

FIG. 1 shows a piconet 101 that includes four Bluetooth enabled devices: a headset 103, a laptop computer 105, a cellular phone 107 and a kiosk such as an airline check-in terminal 109. Cellphone 107, which could also be a handheld PDA, has stored on it files that have been collected from e-mail attachments and internet web browsing or other sources. Alternatively, the cellphone 107 may also have address book data that the owner of the phone may wish to temporarily make available to another Bluetooth device, in this case laptop 105.

Kiosk 109 is connected to a wider area network 111 such as a conventional hardwired ethernet network or other backbone network that interconnects kiosk 109 with other kiosks 113. The network may include centrally managed data resources on file servers or host computer 115. It will be appreciated that not all the devices need to be present to form a piconet 101. For example, a piconet may be formed between just phone 107 or a PDA and kiosk 109.

Figure 4:
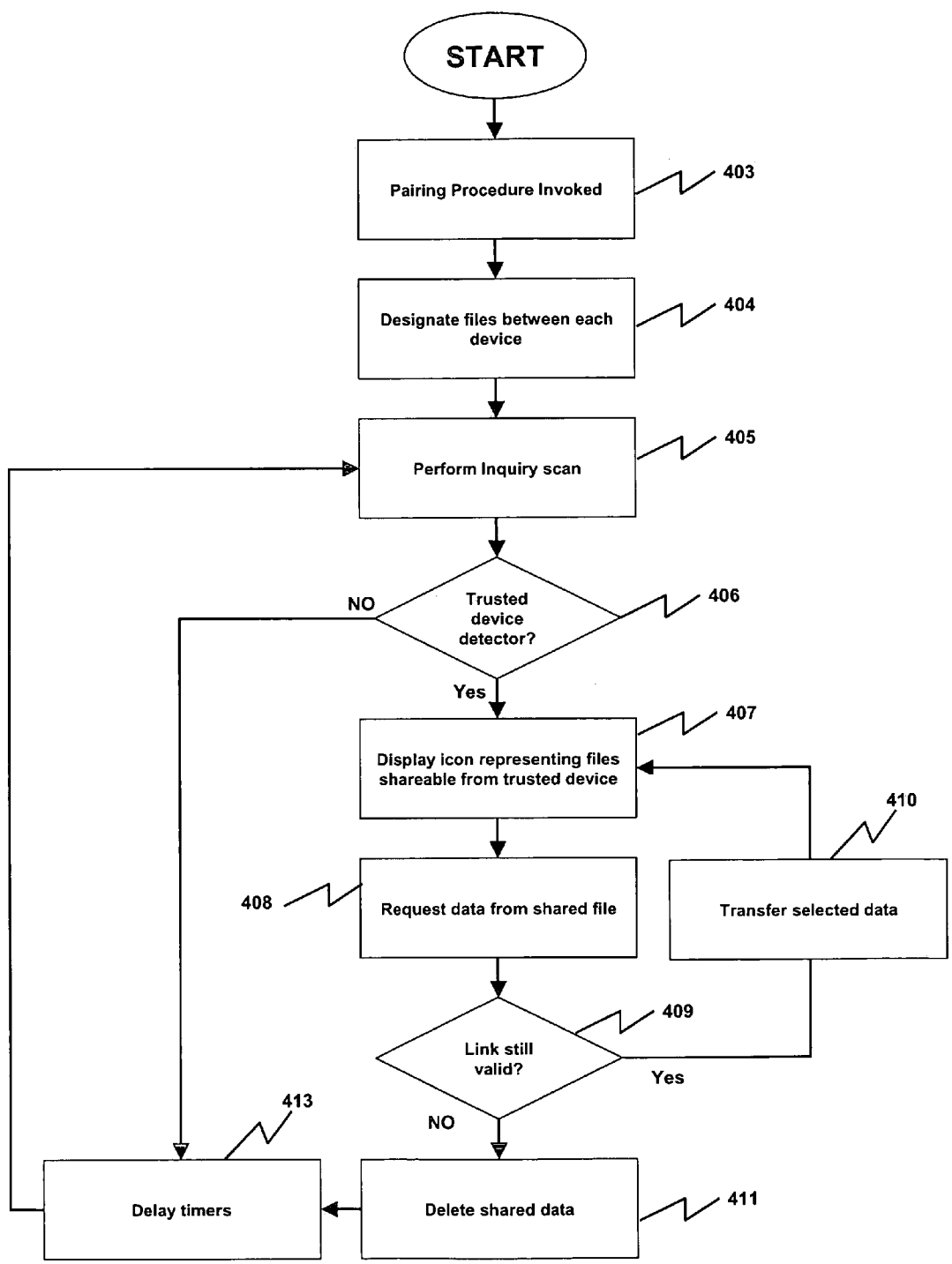
FIG. 4 is a flowchart showing one exemplary embodiment of the method of the invention, as implemented, for example, on a handheld Bluetooth device.

An exemplary embodiment of the invention is described in connection with FIG. 4, which shows the steps of one embodiment of a method of the invention.

Before resources can be shared, a trusted relationship is established between the two Bluetooth devices. The short range nature of Bluetooth wireless networking allows it to be used to establish relative location by querying which known devices are available in the area. Devices become known and trusted by implementing the Bluetooth pairing procedure. Bluetooth pairing is described in detail in the Bluetooth 1.2 core specification, Vol. 3, Section 3.3. A trust relationship is established by exchanging Bluetooth link keys using the device pairing procedure and explicitly marking the device as trusted. Once such a relationship is established, the devices remember that the other Bluetooth device is trusted. This is because each device, as part of the pairing procedure, shares its unique device hardware ID with the other device. Bluetooth hardware Ids are embedded in the Bluetooth chipset and are guaranteed to be unique for every Bluetooth device.

Trusted devices could include cellular phones, desktop computers, laptop computers or specialty devices like Bluetooth key-chains. It is contemplated that typically, a user implementing the invention would invoke the pairing procedure 403 between devices for which it was desired to establish shared resources at some convenient time when the devices were in proximity.

In step 404, the user of each paired device designates any files that may be automatically shared with the other paired device. Optionally, only one device is designated as having sharable files, e.g., an address book or information specific to the other device. For example, a PDA could be "paired" with a check-in kiosk 109 for an airline. The airline could propagate the pairing information to all kiosks 113 in its network 111. When the PDA was detected near any kiosk, the PDA could have access to a sharable file managed by host 115 containing details about that users travel itinerary for the day, including flight status, gate information, etc. Because the system is proximity based, the airline could also use the detection of the PDA to note the traveler's progress towards the date.

In step 405, Bluetooth inquiry scans are performed periodically to detect trusted devices in the area. Inquiry scans can be done as often as every eight seconds. When a trusted device is detected in step 406, the method proceeds to step 407 without intervention from the user.

In step 407, automatic resource sharing is accomplished. It is contemplated that as part of the pairing process, the user would have designated certain files or categories of files as "shareable" with the paired device. For example, when pairing cellphone 105 and laptop 107, the user may designate that for Bluetooth cellphone 105, laptop 107 is a trusted device and vice versa. The user may further designate that a file containing address and phone number information on laptop 107 is sharable with now trusted device cellphone 105. When a user selects the folder or data from the folder in step 408, the device determines whether the link is still valid 409 and if it is, the requested subset of the shared data is uploaded in step 410. When cellphone 105 detects that laptop 107 is in proximity, a virtual file folder is created on the operating system of cellphone 105. The file folder contains links to the data that was previously designated as sharable from laptop 107 to cellphone 105. It is contemplated that in most cases the actual data would not be entirely copied across the Bluetooth link due to capacity constraints on the Bluetooth air link. Rather, the "virtual" appearance would allow the user to browse the index, listing, or key for the data and select only the data needed for review. However, small data sets could be downloaded and stored in their entirety.

The Bluetooth devices continue to perform link management as long as they are in proximity. When the link is detected as broken in step 409, the method moves to step 411, wherein the device that had a virtual appearance for the shared data such as cellphone 105 deletes the shared folder from its operating system. In this way, a measure of security is provided in that the data that is desired to be shared persists only as long as the trusted devices are in physical proximity. Because the method only contemplates that data would be retrieved from the device that actually hosts the data for review and not for permanent copying, some measure of protection is afforded against the wholesale copying a large sharable file resource. Alternatively, for data that is not sensitive, the retrieved data could be allowed to persist on the receiving device.

Alternatively, local copies of the data may be allowed. In the event local copies are made, edits to the local copy could be shared with the originating device. In another embodiment, the trusted device would be allowed to make edits to the data shared. It is contemplated that these options would be configured on a device by device basis depending on the level of trust established in the pairing procedure 403.

If no device is found, or if a device is found and the network connection is successfully configured, the handheld executes a delay 413 before performing the next scan 405. The delay prevents the handheld from performing excessive scans and creation-deletion of data appearances thus draining the battery.

The invention may be substantially integrated onto a chip, for example a Bluetooth chip, the chip having machine-readable storage having stored thereon a computer program having a code section for detecting the presence of other Bluetooth devices. The program may include at least one code section being executable by a machine for causing the machine to perform steps comprising those substantially as shown and described above.

The integrated circuit of the invention may also include an application layer that performs the methods of the invention. The integrated circuit is desirably connected to a Bluetooth radio. The integrated circuit may also have a unique hardware ID.

This technology may be used with Bluetooth enabled handheld devices, cellular phones, personal computers etc., but may also be used for purpose built Bluetooth attached storage devices or media (MP3 etc.) players.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method of sharing data on Bluetooth devices, comprising:
    pairing a first Bluetooth device and a second Bluetooth device, the pairing comprising exchanging Bluetooth link keys;
    designating a file or a folder residing in said second Bluetooth device as sharable with said first Bluetooth device;
    manually browsing an index or a listing that is provided automatically at said first Bluetooth device when it is determined that said second Bluetooth device is in proximity with said first Bluetooth device, the index or the listing corresponding to the file or the folder residing in said second Bluetooth device; and
    manually making a selection from the index or the listing that causes data from at least a portion of the file or at least a portion of the folder to be wirelessly transmitted from said second Bluetooth device to said first Bluetooth device,
    wherein, when said second Bluetooth device is no longer in proximity of said first Bluetooth device, said first Bluetooth device deletes the data that was wirelessly transmitted from said second Bluetooth device to said first Bluetooth device due to the manual selection from the index or the listing.

2. The method of claim 1 comprising pairing said first Bluetooth device with a plurality of second Bluetooth devices.

3. The method of claim 1 wherein manually making the selection from the index or the listing causes at least a portion of an address book residing in said second Bluetooth device to be wirelessly transmitted from said second Bluetooth device to said first Bluetooth device.

4. The method of claim 1 wherein the file or the folder is never entirely copied onto said first Bluetooth device.

5. The method of claim 1 designating a second file or a second folder residing in said first Bluetooth device as sharable with said second Bluetooth device.

6. The method of claim 1, wherein said second device propagates pairing information to a network of devices, each of which is allowed to make said shared resource available on said first Bluetooth device.

7. A system for sharing resources on Bluetooth devices, comprising two paired Bluetooth devices, wherein a first one of said devices is paired with a second one of said devices, said second device having a category of files residing in said second device that is designated as sharable with said first device, said first device automatically presenting a virtual representation of said sharable category of files when said first device and said second device are in proximity to each other, a manual selection of a portion of the virtual representation at said first device causing at least a portion of said sharable category of files to be wirelessly transferred from said second device to said first device,
    wherein, when said second device is no longer wirelessly linked to said first device, said first device automatically deletes the data that was wirelessly transmitted from said second Bluetooth device to said first Bluetooth device due to the manual selection from the virtual representation.

8. The system of claim 7, wherein said first device deletes said virtual representation when said first and second devices are no longer in proximity.

9. The system of claim 7, wherein said category of files comprises an address book.

10. The system of claim 7, wherein said category of files is never entirely loaded onto said first device.

11. The system of claim 7,
    wherein said first device has a second category of files residing in said first device that is designated as sharable with said second device,
    wherein said second device automatically presents a second virtual representation of said sharable second category of files when said first device and said second device are in proximity to each other, and
    wherein a manual selection of a portion of the second virtual representation at said second device causes at least a portion of said sharable second category of files to be wirelessly transferred from said first device to said second device.

12. The system of claim 7, wherein said second device propagates the pairing information for said first device to a network, and wherein a plurality of devices are each allowed to share said shared resource with said first device.

13. An integrated circuit in a first Bluetooth device, said integrated circuit including an application layer that performs the method comprising:
    pairing with a second Bluetooth device;
    detecting the proximity of said second Bluetooth device;
    presenting a virtual file or a virtual folder on a user interface of said first Bluetooth device, the virtual file or the virtual folder representing a particular file or a particular folder residing in said second Bluetooth device, the particular file or the particular folder being designated as accessible to the first Bluetooth device; and causing at least a portion of the particular file or at least a portion of the particular folder residing in said second Bluetooth device to be wirelessly transferred from said second Bluetooth device to said first Bluetooth device when a manual section is made from the virtual file or the virtual folder, wherein said integrated circuit deletes said virtual file or said virtual folder when a link between said first Bluetooth device and said second Bluetooth device becomes invalid.

14. The integrated circuit of claim 13, wherein the integrated circuit is paired with a plurality of second devices.

15. The integrated circuit of claim 13, wherein the particular file or the particular folder corresponds to an address book residing in said second Bluetooth device.

16. The integrated circuit of claim 13, wherein only a subset of the particular file or the particular folder is ever wirelessly transferred from said second Bluetooth device to the said Bluetooth device.

17. The integrated circuit of claim 13, wherein said integrated circuit designates a second particular file or a second particular folder residing in said first Bluetooth device as accessible to said second Bluetooth device, and wherein said integrated circuit causes at least a portion of the second particular file or at least a portion of the second particular folder to be wirelessly transferred to the second Bluetooth device when a second virtual file or a second virtual folder presented at said second Bluetooth device is manually selected at said second Bluetooth device, the second virtual file or the second virtual folder corresponding to the particular file or the particular folder.

* * * * *